(12) United States Patent
Steinbrecher et al.

(10) Patent No.: US 12,544,196 B2
(45) Date of Patent: Feb. 10, 2026

(54) DENTAL MODEL COMPRISING A DETACHABLE TOOTH STUMP

(71) Applicant: EXOCAD GMBH, Darmstadt (DE)

(72) Inventors: Tillmann Steinbrecher, Seeheim-Jugenheim (DE); Akira Schuettler, Mainz (DE); Stefan Thomas Boettner, Seeheim-Jugenheim (DE)

(73) Assignee: EXOCAD GMBH, Darmstadt (DE)

( * ) Notice: Subject to any disclaimer, the term of this patent is extended or adjusted under 35 U.S.C. 154(b) by 897 days.

(21) Appl. No.: 17/774,994

(22) PCT Filed: Nov. 7, 2019

(86) PCT No.: PCT/EP2019/080550
§ 371 (c)(1),
(2) Date: May 6, 2022

(87) PCT Pub. No.: WO2021/089156
PCT Pub. Date: May 14, 2021

(65) Prior Publication Data
US 2022/0387147 A1      Dec. 8, 2022

(51) Int. Cl.
*A61C 9/00*     (2006.01)
*G09B 23/28*    (2006.01)

(52) U.S. Cl.
CPC ............ *A61C 9/002* (2013.01); *G09B 23/283* (2013.01)

(58) Field of Classification Search
CPC ........ A61C 9/002; A61C 13/34; G09B 23/283
USPC ....................................................... 433/213
See application file for complete search history.

(56) References Cited

U.S. PATENT DOCUMENTS

| | | | | |
|---|---|---|---|---|
| 1,512,745 A | * | 10/1924 | Carey, Jr. ............. | G09B 23/283 434/263 |
| 1,948,059 A | * | 2/1934 | Baugh .................. | G09B 23/283 434/263 |
| 3,153,283 A | * | 10/1964 | Weissman .............. | A61C 9/002 433/176 |

(Continued)

FOREIGN PATENT DOCUMENTS

| | | |
|---|---|---|
| DE | 10019339 A1 | 10/2001 |
| EP | 1156463 A1 | 11/2001 |

(Continued)

OTHER PUBLICATIONS

Wirth, Christian, "International Search Report", mailed Sep. 25, 2020, issued in the corresponding PCT Application No. PCT/EP2019/080550, filed Nov. 7, 2019.

*Primary Examiner* — Ralph A Lewis
(74) *Attorney, Agent, or Firm* — PERRY + CURRIER INC.

(57) ABSTRACT

The invention relates to a dental model (1) for dental-technical modeling having a model base (2) and having a tooth stump (4) that can be removed from the model base (2), the model base (2) having a receiving cavity (3) for receiving the tooth stump (4), the tooth stump (4) having a preparation section (5), the preparation section (5) being designed for the prosthetic reconstruction of a tooth and the shaft (6) being designed for insertion along an insertion direction into the receiving cavity (3), the model base (2) and/or the shaft (6) having an elastic positioning element for positioning the tooth stump (4) relative to the model base (2).

19 Claims, 4 Drawing Sheets

(56) References Cited

U.S. PATENT DOCUMENTS

| | | | | |
|---|---|---|---|---|
| 4,801,264 A * | 1/1989 | Weissman | ............... | A61C 9/002 D24/156 |
| 5,030,102 A * | 7/1991 | Lang | .................... | G09B 23/283 434/263 |
| 5,129,822 A * | 7/1992 | Dobbs | .................... | A61C 9/002 433/34 |
| 10,864,063 B2 * | 12/2020 | Brun | ....................... | A61C 13/34 |
| 2002/0049009 A1 * | 4/2002 | Rabenstein | ............ | A61C 9/002 439/889 |
| 2003/0232304 A1 * | 12/2003 | Campanello | ........... | A61C 9/002 433/53 |
| 2006/0003287 A1 * | 1/2006 | Ose | ....................... | G09B 23/283 433/74 |
| 2019/0254792 A1 | 8/2019 | Boronkay et al. | | |
| 2022/0258322 A1 * | 8/2022 | Boronkay | ................ | B25G 1/06 |

FOREIGN PATENT DOCUMENTS

| | | | |
|---|---|---|---|
| EP | 2466571 | A1 | 6/2012 |
| GB | 2122796 | A | 1/1984 |
| WO | 2011103879 | A1 | 9/2011 |
| WO | WO-2019202110 | A1 | 10/2019 |

* cited by examiner

DENTAL MODEL COMPRISING A DETACHABLE TOOTH STUMP

TECHNICAL AREA

The invention relates to a dental model for dental technology modeling and to a method for producing a dental model.

RELATED PRIOR ART

In the prior art, in particular dental models having receiving cavities for removable tooth stumps, are used as a working base for dental technology modeling. The term "model base" here is to be understood as a three-dimensional, patient-specific 1:1 reproduction of at least part of a jaw, that is, the lower and/or upper jaw bone surrounded by gums, in which at least one tooth and/or tooth stump and/or implant and/or pillar of a dental prosthesis or the like may be present. A dental model, in particular a model base having removable tooth stumps, is required in order to obtain optimal access to the circular preparation border on the tooth stumps from all sides.

In this context, the preparation border is understood as the end of the machined tooth hard substance and the beginning of the unmachined tooth surface. However, said tooth stumps very often have to be removed from the dental model, in particular from the model base, in the course of the machining and reinserted into an associated receiving cavity. In this case, the model base must ensure an exactly reproducible position in interaction with the shaft of the tooth stump. The manufacturing tolerances and good handling for the user, usually the dental technician, are of the utmost importance.

The removable tooth stumps correspond, for example, to the teeth that are to be individually crowned with a dental prosthesis. Naturally, other extraorally manufactured dental prostheses such as small ceramic structures such as inlays, onlays, veneers can also be used. Bridges, for example, are also used to replace entire teeth, the pillars of which are prepared as for receiving crowns and also have to be adapted using a dental model.

It has hitherto still been customary to mechanically separate the teeth intended for treatment or the tooth stumps in the model base from a plaster model which has been created from a jaw cast. Various methods are known therefor.

According to a frequently used method, the tooth stumps are removed by saw cuts. This procedure has serious disadvantages, including the destruction of marginal regions of the tooth stumps and/or the model base itself. As a result, part of the cervical region, including the papilla, is usually also lost.

A dental model for training purposes is known from GB 2 122 796 A, this dental model being designed for cost-optimized mass production. The thus generic dental model has a universal model base having a continuous, U-shaped receiving cavity following the contour of the model base. The U-shaped receiving cavity is designed such that all repositionable tooth stumps can be removed and repositioned at any point in the U-shaped receiving cavity.

The surface of the model base is made of a relatively elastically deformable rubber-like material. The U-shaped receiving cavity has at least one rubber-like section in which the tooth stumps can be individually removed and repositioned. The shaft of an associated tooth stump also has a kind of "stop" or a kind of "shoulder" which limits the insertion depth when inserted into the U-shaped receiving cavity. The shaft further has a projection which can engage in a recess in the U-shaped groove, as a result of which the tooth stump can be connected to the dental arch in a form-fitting manner.

However, the dental model is not suitable for the prosthetic reconstruction of a preparation section of a patient-specific dental prosthesis. The U-shaped receiving cavity, in combination with the recess and the projection of the tooth stump, does not ensure that the exact position of a tooth stump intended for prosthetic reconstruction can be maintained. The recess, like the U-shaped groove, is continuous and follows the contour of the model base. It is therefore entirely possible to displace the tooth stump along the contour of the model base within the U-shaped groove. In addition, the groove and the projection do not form a non-twisting form-fit. Thus, an exact position of the tooth stump in the dental model, which is to be considered in relation to the antagonist(s) and/or the proximal neighboring teeth, cannot be exactly reproduced.

A dental model is known from WO 2011/103879 A1, which is virtually designed by means of a CAD-CAM method ("Computer Aided Design" and "Computer Aided Manufacturing") and then physically produced by a generic process, in particular a 3D printing process. The dental model comprises a model base, having a receiving cavity in the model base and a removable tooth stump, the tooth stump having a preparation section and a shaft, the preparation section being intended for the prosthetic reconstruction of a tooth, and the shaft for insertion along an insertion direction into the receiving cavity in the model base, and the shaft being frictionally-engaged and detachably connected to the model base in the receiving cavity.

The shaft and/or receiving cavity are designed such that, in the inserted state, they only form so-called friction points at a few points with the aid of support elements for positioning and thereby create a frictionally-engaged and detachable connection. The support elements, which form the friction points, touch only a fraction of the corresponding surface of the shaft or the wall of the receiving cavity. The support elements forming the friction points can be designed as truncated pyramids or as square truncated cones or rectangular truncated cones, flat bars, squares, ovals, stars or triangles, said listed geometric shapes protruding or projecting on the outer surface of the shaft or the outer surface of the wall of the receiving cavity.

The object of the invention is to provide an improved dental model and a method for producing a dental model. The objects on which the invention is based are achieved by the features of the independent patent claims. Embodiments of the invention are specified in the dependent claims.

DISCLOSURE OF THE INVENTION

Described is a dental model for dental technology modeling having a model base and having a tooth stump that can be removed from the model base, the model base having a receiving cavity for receiving the tooth stump, the tooth stump having a preparation section, the preparation section for the prosthetic reconstruction of a tooth and the shaft for Insertion being formed along an insertion direction into the receiving cavity, the model base and/or the shaft having an elastic positioning element for positioning the tooth stump relative to the model base.

For example, the patient-specific situation of the patient's physical dentition is first recorded by means of an imaging method, in particular an intraoral scan and/or digital volume tomography, an X-ray and/or a scan or a tactile surface measurement of a plaster cast and/or plaster model. A virtual patient-specific situation model can then be generated using CAD/CAM software ("Computer Aided Design" and "Computer Aided Manufacturing") and displayed visually on a suitable device, preferably a screen.

Imaging methods are also understood here as physical measurement methods such as sonography, measurement by means of magnetic resonance tomography, by means of computer tomography or by means of digital volume tomography.

The patient-specific situation model generated virtually by the CAD/CAM software comprises a 2D and/or 3D representation of at least at least one section of the patient's physical dentition, in particular a partial dental arch of a patient or part of the patient's lower and/or upper jaw. The region intended for the dental restoration or prosthetic reconstruction is generated virtually and can therefore also be represented visually.

The region intended for the dental restoration or prosthetic reconstruction further comprises at least a partial dental arch and/or at least one tooth, or a tooth that has already been ground down, or also an edentulous region in the jaw or the dental arch. Likewise, an existing implant-supported dental prosthesis, in which case it can also only be designed as an implant (without a restoration) with a scan marker, can be present in the region intended for a dental restoration or prosthetic reconstruction.

In this context, the region intended for a dental restoration also comprises, for example, a healthy tooth that does not require a prosthetic reconstruction. However, it is provided that said healthy tooth can be removed from the physical dental model that is still to be produced, in particular from the model base, and can also be repositioned. Thus, said tooth, which is part of the dental restoration, can also be functionally detachably connected to the model base or functionally connectable to the model base in order to be able to remove it if necessary. This is particularly necessary when assessing the preparation border of an approximally adjacent tooth intended for prosthetic reconstruction.

The region intended for the dental restoration is then selected or defined in the patient-specific virtual situation model, for example, by the user of the CAD/CAM software. As already explained above, said region intended for the dental restoration can comprise a tooth or a tooth that has already been ground, or also an edentulous region, or a different type of dental prosthesis.

In particular, the region intended for the dental restoration is defined analogously to a known odontogram, such as that of the Federation Dentaire Internationale (FDI). This clearly defines the position in the jaw or in the dental arch. In the edentulous jaw, the regions intended for a dental restoration are also named after the teeth that should be located in the respective dentulous section of the dental arch. If, for example, the tooth is missing due to agenesis or after extraction and the missing tooth is to be replaced by an implant or a pontic or a partial prosthesis, for example, the edentulous section of the dental arch is designated according to the odontogram.

The teeth that are to be replaced or have already been replaced, for example, with an implant, a pontic or a partial prosthesis, are then given the same designation as the permanent teeth according to the odontogram.

The respective preparation border of the region intended for the dental restoration, in particular of a tooth, is preferably already known from the previous imaging recording, such as an intraoral scan, and was automatically defined by the CAD/CAM software or is interactively defined by the user using CAD/CAM software. The preparation border can also already have been automatically recognized and marked by the CAD/CAM software together with the generation of the virtual patient-specific situation model, so that the user only has to confirm said automatic marking or, optionally, subsequently adapt it interactively.

Furthermore, a virtual receiving cavity is defined using the CAD/CAM software in the virtual, patient-specific situation model, preferably according to an odontogram, and accordingly an associated removable virtual tooth stump is automatically generated.

The visual representation of the virtual dental model that is now available for dental technology modeling is preferably carried out via a device suitable for this purpose, for example, a graphic user interface (GUI) having a screen or via data glasses.

A tooth stump, both in the virtual and the physical dental model, is understood in this context as a tooth intended for prosthetic reconstruction, a tooth that has already been ground or an implant and/or implant-supported dentures. A tooth that is not intended for prosthetic reconstruction can also fall under this definition. The removable tooth stump also comprises a preparation section and a shaft or section designed as a type of "shaft".

The prosthetic reconstruction is essentially carried out on the preparation section and thus forms the visible part of the tooth stump when said tooth stump is repositioned in the model base. The prosthetic reconstruction can affect individual teeth, sections of the jaw or the entire masticatory system. Inlays, onlays, veneers, crowns and bridges can be used for this purpose, for example.

The shaft is intended to be inserted into the receiving cavity in the model base and, in a target position provided for this purpose, enables the tooth stump to be visually inspected, particularly with regard to compliance with the preparation border and the distances to the approximally existing teeth and also the opposing antagonists.

As a rule, the dental model with the dental restoration is additionally inserted into a so-called articulator for this purpose. Depending on the setting options of the articulator, the chewing movements of a patient can be simulated more or less precisely, thus providing further indications for an adjustment of the prosthetic reconstruction. Furthermore, a preferred insertion direction, preferably along an insertion axis for the tooth stump, is also defined by the CAD/CAM software, and said insertion direction can also be subsequently adjusted by the user by means of the GUI in the CAD/CAM software.

Naturally, the region intended for a dental restoration can also provide that a plurality of virtual receiving cavities to be generated, wherein only one tooth stump is ever associated with each receiving cavity. Finally, for example, a data set for a generic production, preferably an additive manufacturing process, in particular 3D printing, is generated. A physical dental model for a dental technology modeling, having a model base, having a receiving cavity in the model base and having a removable tooth stump can now be generated using said data set.

As already explained above, the tooth stump has a preparation section and a shaft, the preparation section being intended for prosthetic reconstruction and the shaft being intended for insertion along an insertion direction into the receiving cavity in the model base. A so-called "chamfer" can also be provided between the shaft and the preparation section in order to emphasize the preparation border in relation to the shaft.

The shaft is also arranged in the receiving cavity in a functionally effective manner that can be connected and detached from the model base. In the inserted state, the shaft is preferably arranged in the model base in a so-called "target position" and in particular can be connected or is connected in a functionally effective form-fitting manner and can also be detached again.

The model base and/or the shaft has a positioning element for this purpose. The positioning element of the model base engages in the "target position", for example, in a groove provided for this purpose on the shaft, which results in a form-fitting connection and the tooth stump, in particular the shaft, is fixed against unwanted axial displacement. The groove has a predetermined depth and width for this purpose.

The positioning element may generally have a projection, the projection also having a predetermined depth and width so that the projection can be engaged or inserted into said optional groove. In a further example, the projection is directed radially from the wall of the model base into the receiving cavity for this purpose. Alternatively, the projection can also be arranged such that it protrudes from the lateral surface of the tooth stump and is oriented towards the wall of the model base.

For example, the elastic positioning element of the model base comprises a positioning arm and/or the elastic positioning element of the shaft comprises a shaft extension. Both types of positioning elements can ensure a fixation and/or independent relative positioning of the model base and shaft in the same or different ways. As is described further below, an advantage of the elastic positioning arm could be that due to, for example, a rounding of the positioning arm and/or its point of action (for example, at an "engagement depression" or a projection) on the shaft on which the positioning arm rests, said positioning arm is able to move, in particular to rotate and optionally to lock in this position, the shaft and thus the tooth stump into a desired target position. The rotation results, for example, from the fact that the positioning arm is pre-stressed against the shaft and therefore presses against the shaft at the point of action, the positioning arm and the shaft "rolling" against one another due to said roundings.

An advantage of the shaft extension could be that it, for example, via a projection formed on the shaft extension and engaging an opposing trough in the model base, is able to move the shaft and thus the tooth stump into a target position and optionally lock it in said position. In this case, the movement comprises in particular a translatory movement in and against the insertion direction in order to bring about a desired relative positioning of the model base and tooth stump. Preferably, in this case, the projection is ramp-like in form and comprises an inclined ramp surface which, due to the elasticity and spring force of the shaft extension pre-stressed with respect to the model base, can press against the edge of the trough at a corresponding point of action and thereby can define its positioning relative to the model base in the direction of the axis of the tooth stump. The translation results, for example, from the fact that the shaft extension is pre-stressed against the model base (in particular against the edge of the trough) and therefore presses against the model base at the point of action, the model base and the shaft being displaced against one another due to said incline of the ramp surface. As a result, a form-fitting connection between the shaft extension and the model base that can be detached due to the elasticity results in the target position of the shaft that is then assumed.

It should be noted that a trough is generally understood as a recess in the passage opening of the model base.

In general, it is provided, for example, that the shaft or the model base also have a projection, the shaft assuming a target position when received in the model base, the projection being designed to align the shaft and the model base with one another in order to assume the target position. A type of "self-centering" of the shaft with respect to the model base takes place via the projection in order to bring about a desired alignment of the model base and shaft in the target position.

For example, the projection may comprise a latching lug and/or a friction element.

The dental model can have an engagement depression opposite the projection, the engagement depression and the projection being designed to align the shaft and the model base with one another, in particular due to the forces acting through the elasticity of the positioning element, in order to assume the target position, the positioning arm and the shaft having the opposite combination of the engagement depression and the projection and/or the shaft extension and the model base having the opposite combination of the engagement depression and the projection, in particular the latching connection being provided by the opposite combination of the engagement depression and the projection.

For example, the model base has a wall delimiting the receiving cavity, the shaft extension and the wall having the opposite combination of the engagement depression and the projection.

The engagement depression can further have a maximum deep region, in particular a low point, the target position being defined by an engagement of the projection in the maximum deep region, the shape of the engagement depression being given in particular by a rounding, truncated cone shape, pyramid shape or V-shape. This could have the advantage that the projection, assisted by the spring forces acting from the elasticity of the positioning element, slides in the engagement depression towards the maximum deep region and the shaft and model base are thus aligned with one another.

In a practical example, the positioning element of the model base comprises a positioning arm and/or the positioning element of the shaft comprises a shaft extension. The positioning arm is elastically pre-stressed with respect to the shaft and the shaft extension is elastically pre-stressed with respect to the model base. In the following it is assumed, without restricting the generality, that the positioning arm and the shaft extension each have a projection and that the shaft and that the model base each have a rounded engagement depression that is opposite thereto. Due to the acting spring force, when the respective projection engages in the respective engagement depression, the projection slips along the wall of the depression until it has reached the bottom of the recess, that is, the maximum deep region. Said slipping causes a relative change in the position of the shaft and the model base. In general, said relative change in position can comprise a rotation about the axis defined by the insertion direction or a translation in or against the axis defined by the insertion direction.

The distribution of the positioning arms over the circumference of the shaft and/or the wall can be defined as a function of an odontogram. This is preferably also coupled to the distribution of the axially running grooves. Thus, a tooth stump preferably only ever fits into the receiving cavity defined by the odontogram. It is further conceivable that the projections, in particular the positioning arms, are distributed unevenly over the circumference of the shaft and/or the wall of the model base.

The preparation section should be completely visible, in particular the preparation border is also completely visible in the target position. For this purpose, a predetermined insertion depth for the shaft in the target position is defined or provided in the receiving cavity, for example.

The shaft further has at least one shaft extension. For example, the positioning arm and the shaft extension each have a projection, the projection having or forming a latching lug and/or a friction element. In the example discussed above, the shaft extension could have the ramp shape.

It is optionally provided that the shaft is designed to be divided in the axial direction, thus forming at least two, in particular three shaft extensions. The shaft can also have four or more shaft extensions.

The model base has, for example, a wall delimiting the receiving cavity, the positioning arm forming at least part of the wall. Due to the elasticity of the positioning arm, part of the wall of the model base is also elastic, in particular spring-elastic. This could compensate for manufacturing or wear-related tolerances, which is explained in more detail below.

It is optionally provided that a gap is provided between the shaft extensions and the positioning arms. In addition, it is possible for the shaft extensions to enclose a common hollow in order to have sufficient space available when being pushed into the receiving cavity in order to compensate for a diameter difference between the receiving cavity of the shaft extensions by means of elastic deformation.

The positioning element and the shaft extension preferably extend in the axial direction, in particular parallel to the insertion direction. In an alternative embodiment, two or more of the positioning arms and/or two or more of the shaft extensions extend in the axial direction, two positioning arms each forming an intermediate space and a shaft extension engaging in said intermediate space. In particular, said intermediate space is formed parallel to the insertion direction or the insertion axis, as a result of which guidance is produced during the insertion of the shaft into the model base.

It is provided that the shaft has at least one shaft extension and optionally the positioning arm and the shaft extension each have a projection, the projection having a latching lug and/or a friction element or being formed thereby. The tooth stump could be functionally and effectively connected to the model base of the dental model, particularly in the associated receiving cavity, by the positioning arm, particularly by the associated latching lug, particularly by being axially fixable or axially fixable in the target position.

For this purpose, the shaft has, for example, an engagement depression or groove for engaging the positioning arm of the model base. In a particular development, the latching lug can also be designed as a friction element and fulfill both the function of a latching lug and/or a friction element. The tooth stump is thereby secured against unintentional detachment from the model base, in particular also against twisting. The shaft extension or the shaft extensions and the projection or projections provided thereon, which have or form a latching lug and/or a friction element, can also be used to align the position of the tooth stump via the shaft.

In particular, the tooth stump is aligned along the insertion direction or a corresponding insertion axis, so that the preparation border in the target position is fully visible and the horizontal and vertical alignment also corresponds to the individual patient's situation.

The insertion axis is preferably congruent with the axis of symmetry or central axis of the shaft. It is also helpful here if the shaft and/or the shaft extension has a surface having a surface normal oriented perpendicularly to the insertion direction or insertion axis. It is also advantageous for the fit of the positioning element if the surface of the positioning element is partially convex in form. Alternatively or additionally, the surface of the shaft and/or the shaft extension can also be partially concave in form. The concave or convex surface profile can be seen in a plane in which the insertion direction or insertion axis runs.

Said surface profile could result in the advantage that the shaft can be inserted into the receiving cavity in a comfortable manner. Due to the elasticity and the surface profile, the positioning element, for example, is automatically bent into a position when it is pushed in and is thus pre-stressed, which makes it possible to push it in particularly smoothly. After reaching the target position, for example, the positioning element latches automatically or adheres with friction due to the spring forces acting as a result of the pre-stressing, so that the shaft and model base are then connected (latched) in a form-fitting manner or non-positively connected. Regardless of latching or sticking, after the maximum insertion position has been reached, the tooth stump can be positioned independently relative to the model base due to the spring forces acting as a result of the pre-stressing.

For example, the model base has a plurality, particularly three, of the positioning arms and the shaft has a plurality, particularly three, of the shaft extensions. In this variant, for example, two positioning arms each form an intermediate space extending in the axial direction, in particular parallel to the insertion direction or the insertion axis, the intermediate space being provided for insertion for one of the shaft extensions. The measure that the shaft can be inserted along the insertion direction or the insertion axis into the receiving cavity, wherein the intermediate space forms a kind of guide for a shaft extension, could contribute to an improvement in the accuracy of the alignment of the shaft in the model base or in the receiving cavity.

For a secure hold of the shaft in the model base or the receiving cavity, the shaft optionally has at least one engagement depression for the positioning arm, in particular for the projection of the positioning arm.

For example, the receiving cavity penetrates the model base and for this purpose has an insertion opening at the upper end and a passage opening at the lower end. It is further possible that the shaft assumes a target position in the model base in the received (inserted or pushed in) state, wherein, for example, a projection of a shaft extension bears against part of the wall or part of the wall area of the receiving cavity.

It is also advantageous if the model base has a trough in the region of the passage opening, the shaft extension extending at least partially through the passage opening into the trough. The shape and size of the trough can be modeled on a finger, in particular a part of the thumb. By applying light targeted pressure on the shaft extension and optionally pushing the projection away from the edge of the trough, the shaft could be moved out of the target position in the receiving cavity and then very easily removed from the model base without any tensile force on the preparation section or on having to lay into the preparation. Said pressure on the shaft extension could ensure that, in the case of the ramp discussed above, said ramp slides along the point of action (edge) of the trough and as a result, due to the elasticity, the shaft extension is bent such that it can finally slide into the receiving cavity together with the projection.

In particular, the shaft extension and the positioning arm are resiliently deformable. As a result, production-related and/or wear-related and/or tolerance-related deviations in shape of the dental model, in particular of the shaft and/or the model base or the receiving cavity, could be compensated due to the resulting independent relative positioning of the tooth stump and model base.

It is optionally provided that the clearance diameter of the receiving cavity is at least partially slightly smaller than the diameter of the shaft, so that when the shaft is inserted into the receiving cavity until the target position of the tooth stump or the shaft is reached, the respective elastic element, whether positioned on the shaft and/or on the model base, is elastically deformed. This can, for example, be combined with the concave or convex shape discussed above. In the variant having a plurality of shaft extensions, in the function as elastic elements, the shaft extensions are, for example, aligned such that the direction of the vectors of the resulting springback force of an elastic element intersects with the other vectors of the resulting springback forces in a centroid of area of the shaft. A balance of moments in the optimal alignment of the shaft could thus be ensured.

In an alternative embodiment of the shaft, it can certainly be intended that the axis of symmetry of the shaft is not congruent with the insertion axis. However, this should accordingly be taken into account in the target position of the preparation border.

The optimal alignment of the shaft should preferably be established automatically in all variants due to the functionally effective spring forces on the shaft or the model base. Thus, advantageously, a loss of material from the shaft and/or the model base due to wear could also be tolerable and the optimal alignment of the shaft could be maintained.

It is optionally provided that the shaft has a shoulder, the shoulder being provided as a kind of stop, thereby defining the depth of the target position of the shaft in the receiving cavity in the axial direction, in particular along the insertion axis. In a special embodiment, the shoulder can have a plurality of shoulder segments, the shoulder segments having different extents in the axial direction. This could ensure that the tooth stump is inserted or positioned in the intended alignment in the receiving cavity, since the tooth stump cannot otherwise assume its target position.

For example, the shoulder segments protrude wing-like in the radial direction outwards from the shaft, the geometric shape of the insertion opening of the model base being adapted to the wing-like shoulder segments and forming a form-fitting anti-twist device. Furthermore, an insertion indicator can be provided on the shaft, in particular on a shoulder segment of the shaft. As a result, one would be able to see whether the tooth stump is also in the correct alignment before the shaft is pushed into the receiving cavity.

The dental model is designed such that the shaft can be latched to the model base. In particular, through the insertion indicator, one could see from the outside that the tooth stump and the model base are correctly aligned with one another. Improper, in particular twisted, assembly is preferably not possible since the differently designed shoulder segments prevent this.

If the tooth stump is technically required to be fully inserted into the receiving cavity, the latching lug is preferably no longer visible from the outside. However, said latching lug is, for example, tactilely and/or audibly perceptible when a positioning element engages in a groove in the shaft of the tooth stump.

The dental model can comprise a blocking element, the blocking element being designed to block a detachment of the form-fitting and detachable connection of the shaft extension. This could have the advantage that the model base and the tooth stump remain securely connected to one another and the tooth stump cannot unintentionally detach itself from the model base due to handling of the model base, for example.

For example, the blocking element has a foot, the foot being designed to be brought into form-fitting contact with the shaft extension, the detachment of the form-fitting and detachable connection being blocked as a result of the contact.

The model base can thus have a plurality of shaft extensions, the shaft being designed to receive the blocking element in the cavity formed among the plurality of shaft extensions, the form-fitting contact being provided when the foot is received in the cavity. For example, the cavity is formed by the shaft extensions surrounding a cavity extending along the insertion direction.

In general, the cavity can extend both in the axial direction (insertion direction) of the shaft and in the horizontal direction perpendicular thereto. The blocking element can be inserted from below among the shaft extensions in the model base, which is open from below, or said blocking element can be inserted laterally, for example, through a corresponding opening in the model base, among the shaft extensions. It should be noted that the described options for introducing the blocking element can also be used if only a single shaft extension is used. In this case, the blocking element can also be brought into form-fitting contact with the shaft extension from below or from the side such that a detachment of the form-fitting connection is blocked.

In a further example, the blocking element has a head, the foot being arranged on the head and the head protruding laterally beyond the foot, (for example, in a plane perpendicular to the insertion direction, for example, T-shaped), the trough being adapted to receive the head. The provision of a head could have the advantage that the tooth stump can be sealed from below against the ingress of foreign bodies or liquids, for example.

In the event that a foot is present, the shaft may be designed to receive the foot in the cavity formed among the shaft extensions.

In a further embodiment, the dental model can also have a coupling element. Like the model base, the coupling element forms or comprises an associated receiving cavity for a removable tooth stump, the tooth stump having a preparation section and a shaft. The preparation section is provided for the prosthetic reconstruction of a tooth, and the shaft is provided for insertion along an insertion direction into the receiving cavity in the coupling element, the shaft being functionally detachably connectable or detachably connected to the coupling element in the receiving cavity. For this purpose, the coupling element has at least one positioning element, for example, with an attachment with a latching lug and/or a friction element.

Also like the model base, the coupling element forms, for example, a wall delimiting the receiving cavity, the positioning arm forming at least part of the wall of the coupling element. The outer shape of the coupling element is not tied to that of the model base and can be designed as a geometric body with a circular, elliptical or angular base.

The coupling element can, for example, be used to securely store a removable tooth stump and also improve handling of the tooth stump during preparation. For example, the tooth stump can be easily and precisely fixed in a clamping device with the coupling element.

For example, the shaft in the receiving cavity is detachably connected to the model base in a frictionally-engaged manner, in particular via the projection.

The production of a dental model is for example, as follows: The patient's situation is photographed with an imaging method, preferably digitally with a suitable intraoral scanner, or recorded in an alternative type of imaging. An imaging method is also understood as physical measurement methods such as sonography, measurement by means of magnetic resonance tomography, by means of computer tomography or by means of digital volume tomography. A scan of a plaster cast and/or plaster model of the patient's situation can also be used.

The recorded patient situation is first converted into digital data or a data set and stored in or on a suitable medium. On the basis of said digital data, a three-dimensional representation of a virtual dental model is generated for a dental technology modeling. The respective virtual receiving cavity is defined in the virtual model base of the virtual dental model for the respective virtual tooth stump and a further modified data set is generated on the basis of the definition that has been made.

Said modified data set is then used to produce a physical dental model, the tooth stump being associated with the virtual tooth stump. The physical dental model is or can preferably be implemented by means of an additive manufacturing process.

The production of a dental model according to the invention is, for example, as follows: The physical dental model is preferably produced using a generative manufacturing process or additive manufacturing process, in particular 3D printing. Furthermore, the following processes are mentioned here as examples under additive manufacturing processes: stereolithography (SL), laser sintering (LS), laser beam melting (LBM), electron beam melting (EBM), fused layer modeling/manufacturing (FLM or also fused filament fabrication (FFF)), multi-jet modeling (MJM), poly-jet modeling (PJM), 3D printing (3DP, also binder jetting), layer laminated manufacturing (LLM), digital light processing (DLP), thermal transfer sintering (TTS), metal laminated tooling (MELATO), continuous liquid interface production (CLIP), selective heat sintering (SHS), build-up welding or cladding, wax deposition modeling (WDM), contour crafting, liquid composite molding (LCM).

It is possible for the dental model to be produced individually. The model base can also be produced separately from the tooth stump. The tooth stump can then be inserted into the model base. The model base having the receiving cavity or cavities provided therein can optionally be produced in a different material than an associated tooth stump. For example, polymers such as polylactides, polyhydroxy fatty acids, acrylonitrile-butadiene-styrene copolymer, thermoplastic polyurethane (TPU), epoxy resins can be mixed or combined for this purpose.

Embodiments of the invention could generally have the advantage of counteracting twisting of the shaft in the receiving cavity. In principle, as an alternative to a fundamentally round design, the receiving cavity can also be designed to be rectangular. Due to the frequent repositioning of the tooth stump, however, abrasion that cannot be detected by the eye can occur at the so-called friction points. As a result, the dimensions of the dental model, which was already subject to tolerances beforehand, are additionally negatively influenced, in particular with regard to the support elements and their friction points.

The interaction of the shaft of the tooth stump and the receiving cavity or the coupling element could, due to the additionally present positioning element, ensure that the tooth stump is automatically and continuously brought into the correct position. If said position is lost, the spring forces could cause the tooth stump to be moved back to the desired position. This also applies in the event that repeated use of the tooth stump causes abrasion of the surfaces and tolerances as a result.

Preferably, even if the contact surfaces between the shaft and the receiving cavity (or coupling element) have been worn down and are no longer exactly matched to one another, the tooth stump would be brought back into the correct position by the spring forces and special configuration.

For example, the wall of the receiving cavity formed by the positioning arm is rounded. If this now presses on the corresponding recess in the tooth stump due to its spring force, this could lead to a corresponding automatic rotational alignment of the tooth stump relative to the receiving cavity. The recess in the tooth stump is preferably also designed to be appropriately (oppositely) rounded, so that the spring force and the round design ensure that the tooth stump is always returned/corrected to its desired target position. In general, it is possible that either the wall of the receiving cavity formed by the positioning arm is rounded and/or that the part opposite thereto, for example, the engagement depression of the shaft, is rounded in form.

Even in the case of wear, an exact guidance and fixation of a tooth stump or the associated shaft, especially at the friction points, with an impermissible tolerance deviation and/or wear of the support elements, could be possible. An exact fit, for example, to create a frictional connection, would thus be guaranteed and, as a result, a reliable assessment of the prosthetic reconstruction of the preparation section would also be possible.

This could take into account where the dimensions of the dental model were also significantly influenced by the necessary energy supply during production in all known generic, in particular 3D printing processes, so that a production-related tolerance deviation occurs due to shrinkage and/or warping. This is especially true since the 3D printers themselves are also subject to additional tolerances and deliver different manufacturing quality. For example, a dimensional deviation of ±0.2% for a dental model made with SLA (stereolithography) is quite possible. Due to the material and production-related shrinkage and/or distortion after cooling, the dimensioning and alignment of the support elements, particularly at the friction points provided there, can be very imprecise.

The accuracy requirements for a dental prosthesis, and accordingly also for the manufacture of the dental prosthesis, are very high, otherwise the dental prosthesis is not visually appealing or does not fit the teeth as intended, possibly causing pain and/or infections. Exact guidance and fixation of the tooth stumps could be implemented with the described dental model. Tilting and also twisting and/or axial displacement could be ruled out, which is helpful in order to be able to assess the prosthetic reconstruction of the preparation section in comparison to the antagonists and/or the approximately adjacent teeth.

The dental model could thus ensure that even with frequent repositioning of a removable tooth stump and with the associated wear of the components involved, the prosthetic reconstruction of the preparation section can be assessed in comparison to the antagonists and/or the approximately adjacent teeth and the tolerance range of the different generic manufacturing processes, in particular the 3D printing process, is taken into account.

In the following, in addition to the state of the art, at least one embodiment of the invention is now explained in more detail with reference to the following drawing and the associated description.

BRIEF DESCRIPTION OF THE FIGURES

The drawing shows:

FIG. 1 essentially shows a dental model 1 for a dental technology modeling in a perspective view from the prior art. The model base 2 is clearly visible, in particular the dental arch of a lower jaw with a ground and unground residual dentition surrounded by gums, a receiving cavity 3 being provided in the model base 2. Also visible is a tooth stump 4 associated with the receiving cavity 3 and which can be inserted into the receiving cavity 3 and removed or detached again. The tooth stump 4 has a preparation section 5 provided for prosthetic reconstruction, and an associated shaft 6 adjoining the preparation section 5. The preparation section 5 is separated from the shaft 6 by the so-called circular preparation border 5a.

Figure 1:
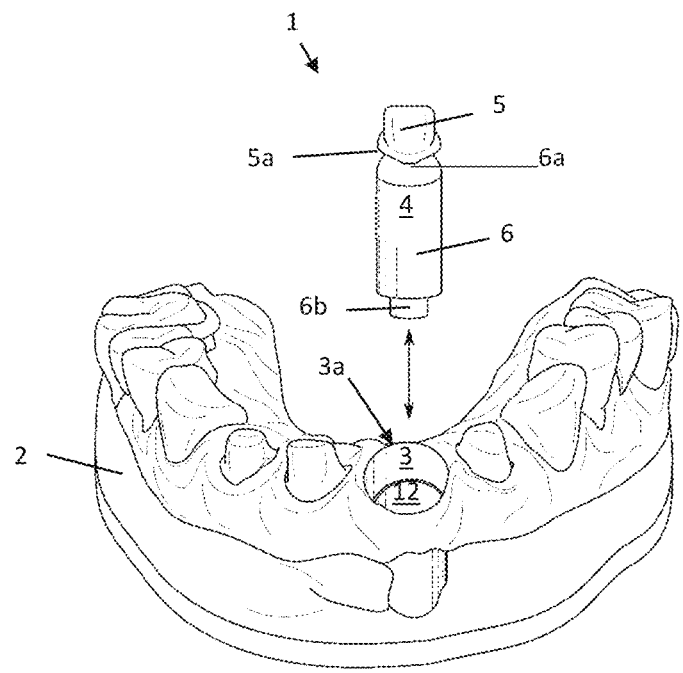
FIG. 1 a perspective representation of a dental model having a removable tooth stump from the prior art, FIG. 2 a dental model for a dental technology modeling in a perspective representation, FIG. 3 a tooth stump for the dental model from FIG. 2 in a schematic three-dimensional representation, FIG. 4a, 4b each schematically, a sectional representation of a shaft within the receiving cavity in the so-called target position in the model base, FIG. 5 in a further schematic representation, a section through the model base in a plan view, in particular the receiving cavity and the positioning arms arranged therein, FIG. 6a the section plane A-A from FIG. 4a and FIG. 4b through the shaft, in particular through the shoulder, the tooth stump being shown in a neutral position A, FIG. 6b the section plane A-A from FIG. 4a and FIG. 4b through the shaft, in particular through the shoulder, the tooth stump being shown in a twisted position B, FIG. 7 a schematic three-dimensional representation of a tooth stump from FIG. 3 with a coupling element, FIG. 8 a schematic sectional representation of the shaft as in FIG. 4b with a blocking element.

In order to optically reinforce this separation between the preparation section 5 and the shaft 6, a chamfer 6a is generally introduced below the preparation border 5a (see FIG. 1). The shaft 6 is essentially cylindrical in form, the shaft 6 having a shoulder at the lower end with an adjoining shaft extension 6b.

Provision is made for the tooth stump 4 to be inserted into the receiving cavity 3 along an insertion direction, which is represented by a double arrow, until it reaches a target position in the receiving cavity 3 and can be removed again counter to the insertion direction. The insertion opening 3a of the receiving cavity 3 is essentially designed to match the diameter of the shaft 6.

When the tooth stump 4 is inserted, in particular the shaft 6, the preparation section 5 protrudes in the target position out of the receiving cavity 3, the shaft 6 in the receiving cavity 3 being functionally and detachably connected to the model base 2 or being able to be functionally and effectively connected or functionally and detachably fixed, in particular being able to be effectively and detachably connected by friction. A frictional connection can be produced in particular by the shaft extension 6b with the model base 2 in that the shaft extension 6b engages in a hollow (not visible) provided in the model base 2 and creates friction regions or friction points (not visible). The friction regions or friction points can also be formed on the shaft 6 itself or in cooperation with or on the wall 12 of the receiving cavity 3.

Figure 2:
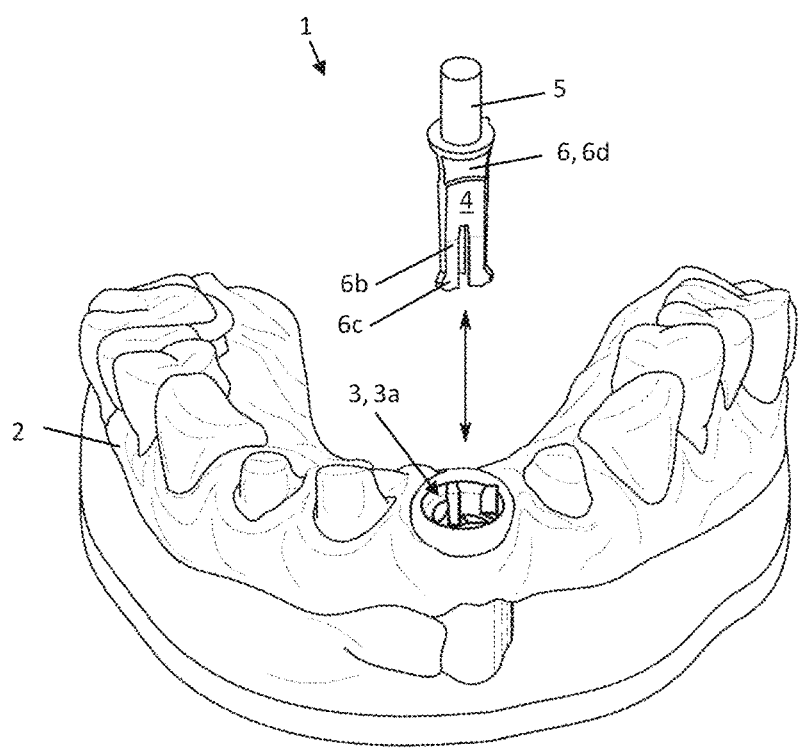

FIG. 2 now shows a dental model 1 according to the invention for a dental technology modeling in a perspective view. The model base 2 is clearly visible, in particular the dental arch of a lower jaw with a ground and unground residual dentition surrounded by gums, a receiving cavity 3 with an insertion opening 3a being provided in the model base 2.

Also visible is a tooth stump 4 associated with the receiving cavity 3 and which can be inserted into the receiving cavity 3 and removed or detached again. The tooth stump 4 has a preparation section 5 provided for prosthetic reconstruction and an associated shaft 6 adjoining the preparation section 5. When the tooth stump 4 is inserted, in particular the shaft 6, the preparation section 5 protrudes in the target position out of the receiving cavity 3, the shaft 6 in the receiving cavity 3 being functionally and detachably connected to the model base 2 or being able to be functionally and effectively connected or functionally and detachably fixed, in particular being able to be effectively and detachably connected by friction.

The preparation section 5 is indicated here only schematically as a cylindrical section. It is also clearly visible that the shaft 6 is divided into, for example, three shaft extensions 6b or has three shaft extensions 6b. The shaft extensions 6b extend along or parallel to the insertion direction (double arrow) and each have a projection 6c at the end of the shaft extension 6b and preferably opposite the preparation section 5. The projection 6c is designed here as a friction element, but can also be designed as a latching lug. It is also conceivable that a combination of friction element and latching lug form the projection 6c or that there are a plurality of projections 6c on the shaft extension 6b. Also visible is an optional engagement depression 6d on the shaft 6.

Figure 3:
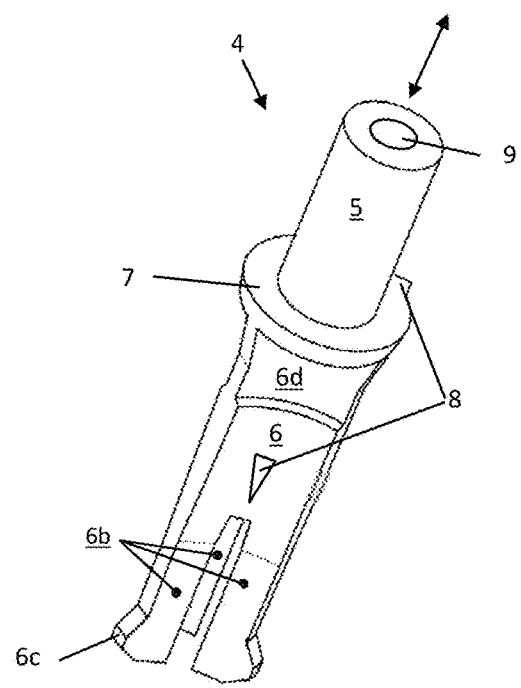

FIG. 3 now shows, in a schematic three-dimensional representation, a tooth stump 4 for the dental model 1 according to the invention from FIG. 2. As already described above, the tooth stump 4 has a preparation section 5 provided for prosthetic reconstruction, and an associated shaft 6 adjacent to the preparation section 5. It can be seen that the shaft 6 in FIG. 3 is divided into a plurality of, here three, shaft extensions 6b or has three shaft extensions 6b. The shaft extensions 6b extend along or parallel to the insertion direction (shown as a double arrow), each having a projection 6c at the end opposite the preparation section 5. The projection 6c is designed here as a friction element, but can also be designed as a type of latching lug.

The surface of the shaft 6 and the shaft extension 6b are designed, for example, such that they each have at least one surface normal or a normal vector (not shown) aligned perpendicular to the insertion direction. It is also optional that the shaft 6 and the shaft extension 6b are at least partially concave in form. This achieves a better fit in the receiving cavity 3 (see also FIG. 2) and also aligns a resulting spring force analogously to a surface normal or a normal vector.

The shaft 6 further has, for example, an engagement depression 6d. The shaft extension 6b is also, for example, elastically deformable, in particular resiliently deformable. Production-related and/or wear-related and/or tolerance-related shape deviations of the dental model 1, in particular of the shaft 6 and/or the model base 2 or the receiving cavity 3, could be compensated in this way.

In the embodiment having a plurality of shaft extensions 6b, the shaft extensions 6b and the associated friction surfaces 6c of the shaft extensions 6b are aligned in particular such that the vector of the resulting springback force, analogous to a surface normal or a normal vector, intersect with the vectors of the springback forces of the otherwise existing shaft extensions 6b in a centroid of area (not shown) of the shaft 6. The centroid of area does not necessarily have to be positioned inside the shaft 6 here.

The shaft 6 has an optional shoulder 7, the shoulder 7 being provided as a kind of "stop" and thereby defining the depth of the target position of the shaft 6 within the receiving cavity 3 in the axial direction. In addition, a visible insertion indicator 8 is also provided on shoulder 7, for example, visible insertion indicator 8 indicating the predetermined orientation of the shaft 6 with respect to the model base 2 (see also FIG. 2) in order to introduce the shaft 6 into the receiving cavity 3 in the predetermined orientation (see also FIG. 2). The insertion indicator 8 can also be provided on the shaft 6 as a kind of "mark" in the form of a symbol. The symbol is preferably visible and palpable, for example, as an arrow or a triangle or the like, in/on the shaft 6 and has already been added during manufacture. Furthermore, the shaft 6, in particular the preparation section 5, can be provided with a receptacle 9 for a handling tool (not shown).

Figures 4A, 4B:
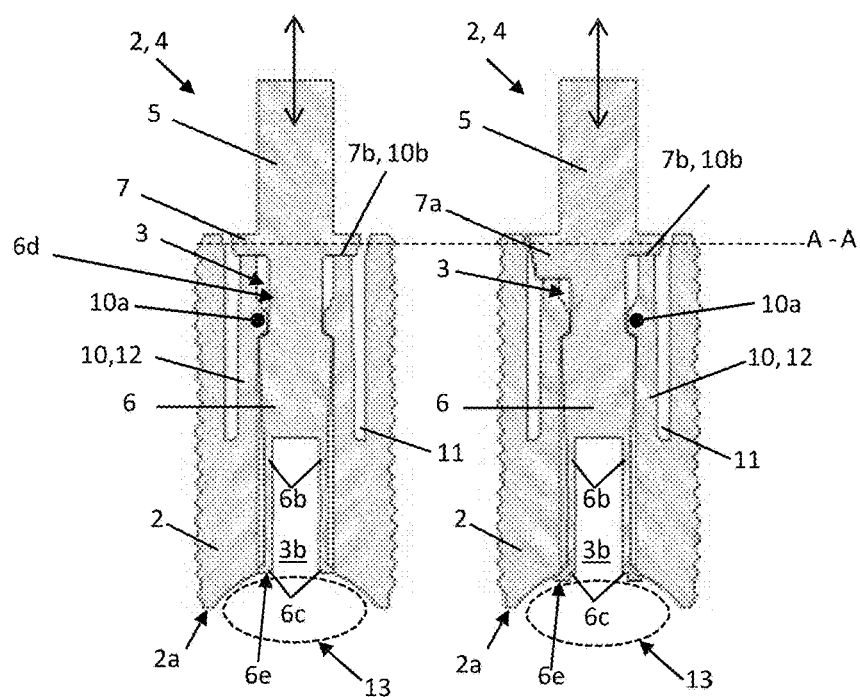

FIGS. 4a and 4b each show a schematic, sectional representation of the tooth stump 4 and part of the model base 2. In particular, FIGS. 4a and 4b show the tooth stump 4 and the shaft 6 in the model base 2, in particular in the associated receiving cavity 3, the tooth stump 4 being in the target position. The shaft 6 can be fixed or locked in a form-fitting manner within the model base 2, in particular in the receiving cavity 3.

It is easy to see that the shaft 6 has the optional shoulder 7, the shoulder 7 being provided as a stop and thereby defining or delimiting the depth of the target position of the shaft 6 in the receiving cavity 4 in the axial direction, for example, in cooperation with a positioning element 10 of the model base. In the target position of the shaft 6, the shoulder(s) 7 lie(s) on the end face(s) of the respective positioning element 10 and thus limit the depth of the target position of the shaft 6 in the receiving cavity 4 in the axial direction.

FIG. 4b also schematically shows that shoulder 7 can have different extents in the axial direction. Shoulder 7 can be divided into shoulder segments 7a for this purpose. The shoulder segments 7a have different extents in the axial direction. As already described above, analogously to the shoulder 7, the shoulder segments 7a now lie in the target position of the shaft 6 on the axial end face(s) of the respective positioning element 10. The axial extent of the positioning arm 10 is accordingly adapted to the axial extent of the corresponding shoulder segment 7a. This ensures that the tooth stump 4 is positioned in the intended alignment and depth in the receiving cavity 3.

The shoulder 7 preferably ends with the model base 2 in the target position such that the preparation border 5a (not shown, see also FIG. 1) of the preparation section 5 is completely visible and can accordingly also be assessed visually. In order to improve the accuracy of the target position, it is provided, for example, that the end face 10b of the positioning arm 10 and the corresponding bearing surface 7b of the shoulder 7 or shoulder segment 7a are optimized with a slice level (layer or pressure level).

Accordingly, provision is advantageously made for these optimized slice levels (layers) to be produced with the lowest possible tolerance of the 3D printer provided for use.

However, 3D printing itself is preceded by so-called "slicing". The slicing is required to prepare the dental model 1 for layer production or the 3D printing process. For this purpose, the dental model 1 or the virtual three-dimensional model is divided into individual layers.

The slicing process comprises the degrees of freedom, for example, the starting point of the cutting sequence and the thickness of each layer. The choice of these parameters influences the manufacturing process and the result. The number of layers significantly affects the time required for production, while the layer thickness affects the tolerance. Thus, for an optimized target position of the tooth stump 4, the end face 10b of the positioning arm 10 and the corresponding bearing surface 7b of the shoulder 7 or 7a are preferably produced with the smallest possible layer thickness of a 3D printer.

Furthermore, the positioning arm 10 as part of the wall 12 of the model base 2 in the receiving cavity 3 can be clearly seen in FIGS. 4a and 4b. An undercut 11 corresponding to the positioning arm 10 is provided in the model base 2 for this purpose. The undercut 11 makes it possible for the positioning arm 10 to deform elastically when the shaft 6 is inserted into the receiving cavity 3. The dimensioning of the undercut 11 determines the maximum deflection of the positioning arm 10. As already described, the positioning arm 10 is elastically deformable for this purpose.

As shown in FIGS. 4a and 4b, for example, the projection 10a of the positioning arm 10 snaps into the engagement depression 6d of the shaft 6 in the target position. Production-related and/or wear-related and/or tolerance-related shape deviations of the dental model 1, in particular of the shaft 6 and/or the model base 2 or the receiving cavity 3, can be compensated in this way. In the embodiment having a plurality of positioning arms 10, the positioning arms 10 and the associated engagement depressions 6d of the shaft 6 are aligned such that the direction of the vectors of the resulting springback force in each case intersect with the vectors of the resulting springback forces of the other positioning arms 10 present in a centroid of area of the shaft 6.

Furthermore, it can be seen in the schematic representation of FIGS. 4a and 4b that the shaft 6 has a plurality of shaft extensions 6b. The shaft extensions 6b extend along or parallel to the insertion direction (represented as a double arrow), each having a projection 6c at the end of the shaft extension 6b or the preparation section 5 opposite.

The projection 6c is, for example, designed as a friction element in FIG. 4a and is supported in particular inclined against the wall 12 of the model base 2 within the receiving cavity 3. In FIG. 4b, the projection 6c can be seen clearly in an alternative variant, designed as a combination of a latching lug and a friction element. Advantageously, the end faces 6e of the projection 6c, whether designed as a latching lug or as a friction element, can also be used as support surfaces for production in a generic method. This procedure reduces the post-processing effort considerably, since the potentially resulting overhang of the support surface, in particular in the axial direction, can be used to press the tooth stump 4 out of the model base 2 against the insertion direction.

For this purpose, a recess in the form of a trough 13 is provided on the model base 2, in particular on the underside 2a of the model base 2. The trough 13 is provided below the receiving cavity 3, in particular at the lower end of the passage opening 3b. The shaft extensions 6b can end with the edge of the trough 13, as shown in FIG. 4a, or extend at least partially into the trough 13, as shown in FIG. 4b.

The trough 13 is modeled here, for example, in shape and size on a finger, in particular a thumb. The trough 13 can of course also be designed as a receptacle provided for a tool. By means of a targeted light pressure on the end face 6e of the shaft extension 6b, the shaft 6 can again now be moved out of the target position in the receiving cavity 3 and then very easily removed from the model base 2 or from the receiving cavity 3 without having to apply an increased tensile force to the preparation section 5 or to the preparation (not shown). The slight pressure on the end face 6e in the direction opposite to the insertion direction enables the shaft to move if the projection 6c is designed purely as a friction element, since in this case only the frictional force acting between the wall 12 and the inclined projection 6c has to be overcome. If there is a latching, the projection 6c must first be moved inwards, that is, the latching must be released before the shaft 6 can be moved out of the target position in the receiving cavity 3 by pressure on the end face 6e.

Figure 5:
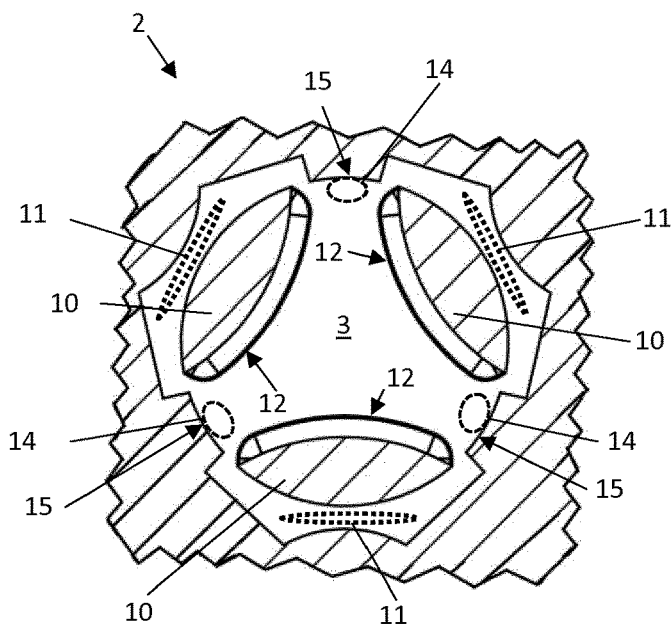

A section through the model base 2 in a top view is shown in FIG. 5 in a further schematic representation. The sectional view only represents the region around the receiving cavity 3. Accordingly, the receiving cavity 3 and the positioning arms 10 arranged in the receiving cavity 3 are clearly visible. It is also easy to see that the undercut 11 (highlighted by a dotted line) is provided between the model base 2 and the positioning element 10.

It can also be seen that the model base 2 has a wall 12 delimiting the receiving cavity 3 and that said wall is at least partially formed by the positioning arm 10. In a further embodiment, the positioning arm 10 extends in the axial direction, in particular parallel to the insertion direction, which ensures guidance during the insertion of the shaft 6 (not visible, see also FIG. 4) into the model base 2. In addition, the surface of the positioning arm 10 forming part of the wall 12 is partially convex, for example.

In addition, the surface of the shaft 6 (not shown, see also FIG. 4) and/or the shaft extension 6a (not shown, see also FIG. 4) can also be partially concave in form. This special shape prevents the shaft 6 from twisting in the model base 2.

It is particularly visible that in this particular variant, the model base 2 has three positioning arms 10. However, it should also be pointed out that embodiments having two, four or six positioning arms 10 are conceivable, regardless of the number of shaft extensions 6b.

Furthermore, it can be seen that the positioning arms 10 can form an intermediate space 14 (shown schematically by the enclosed area of the dashed line) extending in the axial direction, in particular parallel to the insertion direction or the insertion axis. The intermediate space 14 is provided for insertion of a shaft extension 6b, in particular for the projection 6c, the intermediate space 14 forming a type of guide for the shaft 6 and thereby contributing to an improvement in the accuracy of the alignment of the shaft 6 in the model base 2. In addition, an optional wall 15 of the model base 2 can also be seen in this region of the intermediate space 14, which region is also provided as a contact surface for the projection 6c.

Figures 6A, 6B:
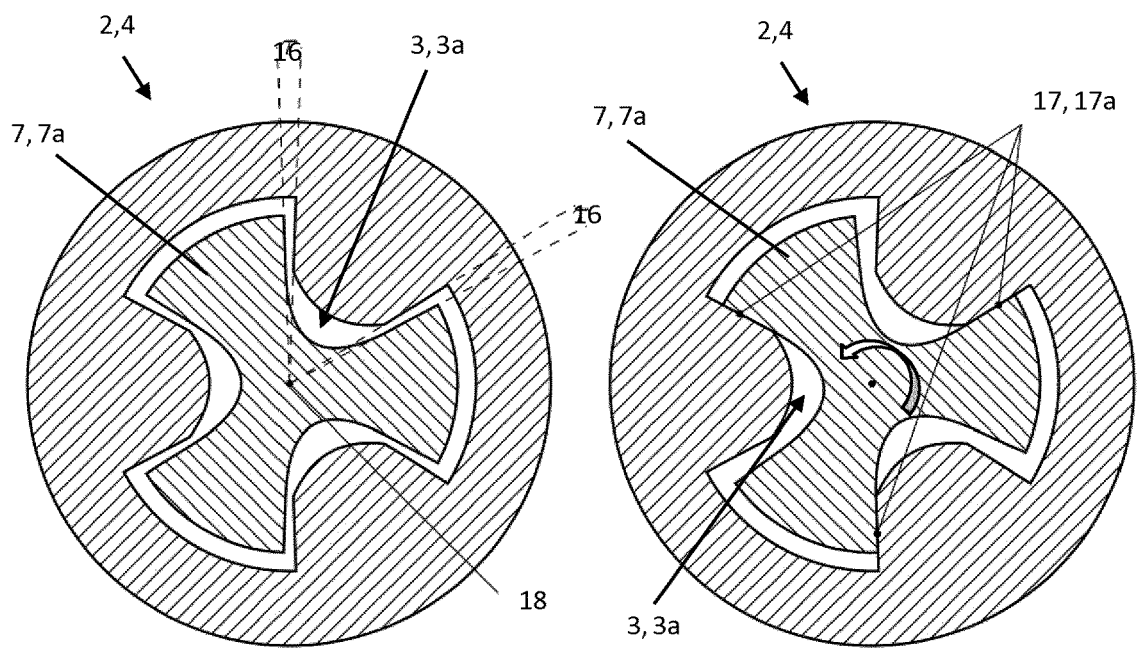

FIGS. 6a and 6b now show the section plane A-A of FIGS. 4a and 4b through the shaft 6, in particular through the shoulder 7 or through a shoulder segment 7a. In addition, the model base 2 is partially shown in a plan view in the sectional representation. The sectional view only represents the region around the receiving cavity 3.

A neutral, non-twisted position A of the tooth stump 4 is visualized in FIG. 6a. An undesirably large clearance 16 can be seen, which could result from manufacturing-related tolerances or subsequent shrinkage of the shaft 6. From FIG. 6b, position B, it can be seen how a twisting of the shaft 6 by the value of the clearance 16 about the pivot point 18 is counteracted in a form-fitting manner by the formation of contact surfaces 17. It is easy to see that the shoulder 7, 7a protrudes outwards from the shaft 6 in a wing-like manner in the radial direction. It can further be seen that the geometric shape of the insertion opening 3a is adapted to the wing-like shoulder 7, 7a, thereby forming a form-fitting anti-twist device by forming contact surfaces 17.

Shoulder 7, 7a does not necessarily have to be designed with three wings. An embodiment having only one or two wings is also conceivable. However, it is advantageous if the sum of the forces occurring at the contact points 17a when there is a twisting by the clearance 16 between the model base 2 and the shoulder 7, 7a are in equilibrium. The contact surfaces 17 can therefore be designed among the shaft extensions 6a and the positioning arms 10 of the model base 2.

Figure 7:
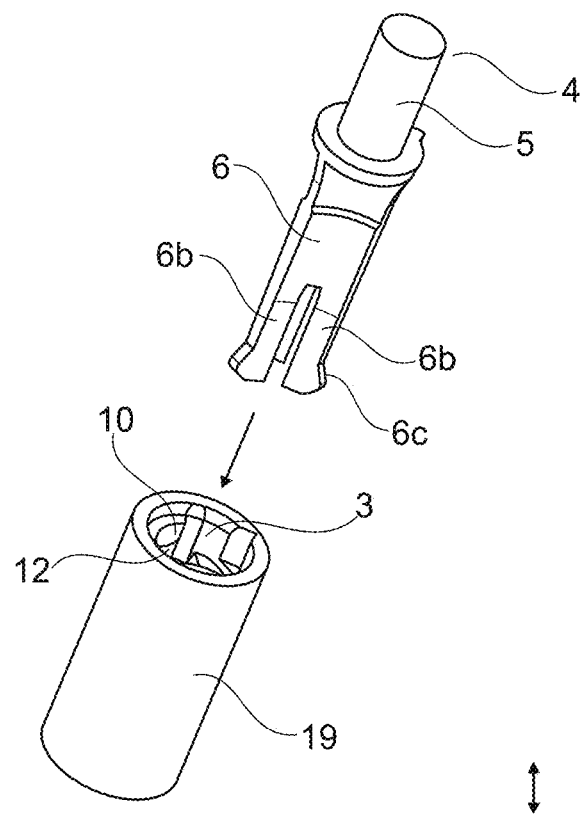

FIG. 7 shows an exemplary, schematic three-dimensional representation of a tooth stump 4 (such as from FIG. 3) with a coupling element 19. Like the model base 2 (not shown, see FIG. 2), the coupling element 19 forms or comprises an associated receiving cavity 3 for a removable tooth stump 4, the tooth stump 4 having a preparation section 5 and a shaft 6. The preparation section 5 is provided for the prosthetic reconstruction of a tooth and the shaft 6 is provided for insertion along an insertion direction into the receiving cavity 3 in the coupling element 19.

Like the model base 2, the coupling element 19 forms a wall 12 delimiting the receiving cavity 3, the positioning arm 10 forming at least part of the wall 12. The outer shape of the coupling element 19 is not tied to the shape of the model base 2 (not shown, see FIG. 2) and can be designed as a geometric body having a circular, elliptical or angular base. The coupling element 19 can be used, for example, for securely storing a removable tooth stump 4, or to improve handling of the tooth stump 4 during manual preparation. For example, the tooth stump 4 can be easily and precisely fixed in a clamping device with the coupling element 19.

Figure 8:
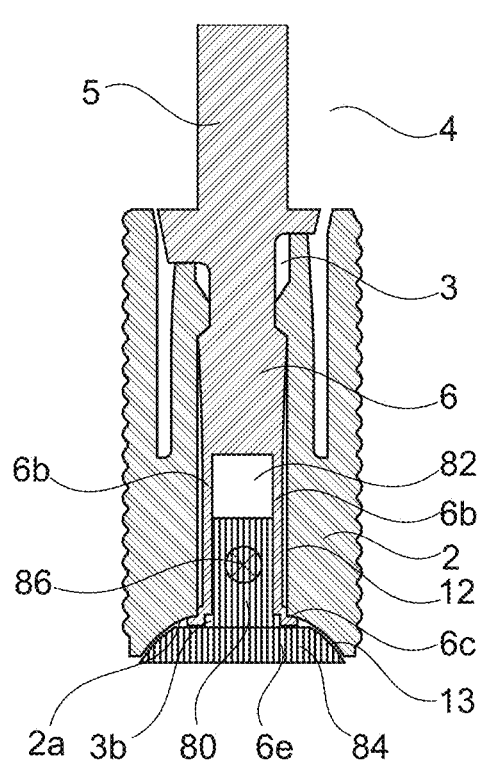

FIG. 8 shows a schematic view of a further variant of a tooth stump 4 and part of a model base 2, each in a sectional view. Tooth stump or model base can have some or all of the elements discussed in relation to FIG. 4b. FIG. 8 shows in particular the tooth stump 4 or the shaft 6 in the model base 2, in particular in the associated receiving cavity 3, the tooth stump 4 being located in the target position. Furthermore, it can be seen in the schematic representation of FIG. 7 that the shaft 6 has a plurality of shaft extensions 6b. The shaft extensions 6b extend along or parallel to the insertion direction (represented as a double arrow), each having a projection 6c at the end of the shaft extension 6b or the preparation section 5 opposite.

The projection 6c is designed as a latching lug in FIG. 8 and is supported against the wall 12 of the model base 2 within the receiving cavity 3. In order to be able to move the shaft 6 out of the receiving cavity 3, the latching between the projection 6c and the wall 12 must be released by the projection 6c being moved inwards. In the case of a plurality of shaft extensions 6b, this means that if said shaft extensions 6b all have the latching projection, the latching must be released for all shaft extensions 6b. This can be done by moving the shaft extensions 6b towards each other (for example, inwards). The shaft 6 can now be moved out of the target position in the receiving cavity 3 by pressure on the end faces 6e of the respective shaft extensions 6b.

A blocking element with a foot 80 can be used to prevent the latch formed by the projection(s) 6c from being unintentionally released. The foot 80 can generally be designed to be brought into form-fitting contact with the shaft extension(s) 6b, the release of the latching connection or generally the form-fitting connection being blocked as a result of the contact. In the example of FIG. 8, the shaft has a cavity 82 which is surrounded, in particular cylindrically, by the shaft extensions 6b. If the foot 80 is now inserted into the cavity 82 from below, the foot 80 blocks an inward movement of the shaft extensions 6b into the cavity, so that the latching formed by the projections can no longer be released due to the form-fit with the foot 80.

In FIG. 8, a recess in the form of a trough 13 is provided on the model base 2, in particular on the underside 2a of the model base 2. The trough 13 is provided below the receiving cavity 3, in particular at the lower end of the passage opening 3b. The blocking element can also have a head 84, the foot 80 being arranged on the head 84 and the head protruding laterally beyond the foot, the trough 13 being designed to receive the head 84. The head 84 is received in the trough 13, for example, such that, due to the receipt of the head 84 in the trough 13, a liquid-tight or even a gas-tight seal of the model base 2 is realized from below.

While in FIG. 8 the foot 80 is inserted into the cavity 82 from below in the insertion direction marked with a double arrow, it is also possible to insert the foot 80 into the cavity 82 from the side, for example, in a direction perpendicular to the insertion direction marked with a double arrow. This can take place at the level of the position 86 marked with an X, that is, in FIG. 8 into the plane of the drawing. In this case too, the foot 80 ensures that, due to the form-fit of the foot 80 with the shaft extension(s) 6b, movement of the shaft extensions 6b and thus the projections 6c is prevented—the latching with the wall can therefore be secured. Only after the foot 80 has been removed can the shaft extensions be moved such that the latching is released and the tooth stump 4 can be removed from the model base 2.

LIST OF REFERENCE SYMBOLS

1 dental model
2 model base
2a underside
3 receiving cavity
3a insertion opening
3b passage opening
4 tooth stump
5 preparation section
5a preparation border
6 shaft
6a chamfer
6b shaft extension
6c projection
6d engagement depression
6e end face
7 shoulder
7a shoulder segments
7b bearing surface
8 insertion indicator
9 receptacle
10 positioning element
10a projection
10b end face
11 undercut
12 wall
13 trough
14 intermediate space
15 wall
16 clearance
17 contact surface
17 contact point
18 pivot point
19 coupling element
80 foot
82 cavity
84 head
86 position

The invention claimed is:

1. A dental model for a dental technology modeling, comprising:
a model base; and
a tooth stump that can be removed from the model base, the model base comprising a receiving cavity for receiving the tooth stump,
the tooth stump comprising:
a preparation section, the preparation section being designed for prosthetic reconstruction of a tooth; and
a shaft being designed for insertion along an insertion direction into the receiving cavity,
wherein one or more of: the model base comprises a first positioning element; and the shaft comprises a second positioning element, the first and second positioning element being an elastic positioning element for positioning the tooth stump relative to the model base,
wherein the shaft has a shoulder,
wherein the shoulder is designed as a stop and as a result the depth of a target position of the shaft in the receiving cavity is delimited in an axial direction of the tooth stump,
wherein the shoulder has a plurality of shoulder segments forming the stop, wherein the shoulder segments have different extents in the axial direction,
wherein one or more of: the first positioning element comprises a positioning arm configured to contact the shaft; and the second positioning element comprises a shaft extension configured to contact the model base.

2. The dental model according to claim 1, wherein one or more of the positioning arm and the shaft extension is for form-fitting and detachable connection of the model base to the tooth stump, by a latching connection.

3. The dental model according to claim 1, further having a projection of the shaft or the model base, wherein the shaft assumes the target position when received in the model base, wherein the projection is to align the shaft and the model base with one another to assume the target position.

4. The dental model according to claim 3, further having an engagement depression opposed to the projection, wherein the engagement depression and the projection are to align the shaft and the model base with one another to assume the target position, wherein the positioning arm and the shaft have the opposite combination of the engagement depression and one or more of the projection and the shaft extension and the model base have the opposite combination of the engagement depression and the projection, wherein a latching connection is provided by the opposite combination of the engagement depression and of the projection.

5. The dental model according to claim 4, wherein the model base has a wall delimiting the receiving cavity, wherein the shaft extension and the wall have the opposite combination of the engagement depression and the projection.

6. The dental model according to claim 4, wherein the engagement depression has a maximum deep region, wherein the target position is defined by an engagement of the projection in the maximum deep region, wherein the shape of the engagement depression is provided by a rounding, truncated cone shape, pyramid shape or V-shape.

7. The dental model according to claim 3, wherein the model base has a trough in the region of the passage opening, wherein the shaft extension extends at least partially into the trough through the passage opening, wherein the form-fitting and detachable connection results from an engagement of the projection in the trough.

8. The dental model according to claim 7, further having a blocking element, wherein the blocking element is to block a detachment of the form-fitting and detachable connection of the shaft extension.

9. The dental model according to claim 8, wherein the blocking element has a foot, wherein the foot is to be brought into form-fitting contact with the shaft extension, wherein due to the contact, the detachment of the form-fitting and detachable connection is blocked, wherein the model base has a plurality of shaft extensions, wherein the shaft is to receive the foot in the cavity formed among the plurality of shaft extensions, wherein the form-fitting contact is provided when the foot is received in the cavity.

10. The dental model according to claim 9, wherein the blocking element has a head, wherein the foot is arranged on the head and the head projects laterally beyond the foot, wherein the trough being to receive the head.

11. The dental model according to claim 1, wherein the model base has a wall delimiting the receiving cavity, wherein the positioning arm forms at least part of the wall.

12. The dental model according to claim 1, wherein the positioning arm and the shaft extension extend in the axial direction, parallel to the insertion direction.

13. The dental model according to claim 1, wherein one or more of: the model base has a plurality of the positioning arms; and the shaft has a plurality of the shaft extensions.

14. The dental model according to claim 13, wherein an intermediate space extending in the axial direction, parallel to the insertion direction, is formed by two of the positioning arms, wherein the intermediate space is to receive the shaft extension.

15. The dental model according to claim 14, wherein the intermediate space forms a guide for the shaft extension during insertion.

16. The dental model according to claim 1, wherein the receiving cavity penetrates the model base and has an insertion opening at an upper end of the receiving cavity and a passage opening at a lower end of the receiving cavity.

17. The dental model according to claim 1, wherein the shoulder segments have a wing shape and protrude in the radial direction of the tooth stump outwards from the shaft.

18. The dental model according to claim 17, wherein the geometric shape of an insertion opening of the receiving cavity is adapted to the wing shape of the shoulder segments and forms a form-fitting anti-twist device with the shoulder segments.

19. A method for producing a dental model according to claim 1, having the following method steps:
generating a three-dimensional representation of a virtual dental model for a dental technology modeling, with a virtual model base based on previous recordings using an imaging method, including one or more of an intraoral scan, digital volume tomography, and a scan of one or more of a plaster cast and plaster model,
defining a virtual receiving cavity in the virtual model base of the virtual dental model for the virtual tooth stump,
generating a data set based on the definition made,
producing the dental model by means of an additive manufacturing process using said data set, wherein the tooth stump is associated with the virtual tooth stump.

* * * * *